US012040144B2

(12) United States Patent
Primel et al.

(10) Patent No.: US 12,040,144 B2
(45) Date of Patent: Jul. 16, 2024

(54) PYROTECHNIC SWITCH

(71) Applicant: Autoliv Development AB, Vargarda (SE)

(72) Inventors: Valentin Primel, Pont de Buis (FR); Francois Gaudinat, Amblainville (FR); Jean Champendal, Quimper (FR); Ludovic Lageat, Telgruc sur Mer (FR); Philippe Fernandez, Pont de Buis (FR); Gildas Clech, Pont de Buis (FR); Catherine Lebarh, Pont de Buis (FR)

(73) Assignee: Autoliv Development AB, Vargarda (SE)

( * ) Notice: Subject to any disclaimer, the term of this patent is extended or adjusted under 35 U.S.C. 154(b) by 195 days.

(21) Appl. No.: 17/753,206

(22) PCT Filed: Aug. 26, 2020

(86) PCT No.: PCT/EP2020/073827
§ 371 (c)(1),
(2) Date: Feb. 23, 2022

(87) PCT Pub. No.: WO2021/037896
PCT Pub. Date: Mar. 4, 2021

(65) Prior Publication Data

US 2022/0285115 A1 Sep. 8, 2022

(30) Foreign Application Priority Data

Aug. 30, 2019 (FR) ...................................... 1909586

(51) Int. Cl.
*H01H 39/00* (2006.01)

(52) U.S. Cl.
CPC ..... *H01H 39/006* (2013.01); *H01H 2039/008* (2013.01)

(58) Field of Classification Search
CPC .. H01H 39/006; H01H 2039/008; H01H 9/40; H01H 39/00
(Continued)

(56) References Cited

U.S. PATENT DOCUMENTS 8,653,386 B2 * 2/2014 Ukon .................. B23D 15/145 200/61.08
10,532,714 B2 1/2020 Seid
(Continued)

FOREIGN PATENT DOCUMENTS

CN 113258540 A 8/2021
DE 102012212509 A1 1/2014
(Continued)

*Primary Examiner* — Lheiren Mae A Caroc
(74) *Attorney, Agent, or Firm* — Harness, Dickey & Pierce, P.L.C.; Stephen T. Olson

(57) ABSTRACT

A pyrotechnic switch having a casing, at least one electrical conductor passing through the casing, a piston housed in the casing, the piston-casing assembly being designed to cut the electrical conductor at least at three separate locations, so as to form at least two free conductive strands, separate from the rest of the electrical conductor, a pyrotechnic actuator designed to force the piston to cut the electrical conductor, wherein the piston-casing assembly is designed to cut the electrical conductor such that each free strand has at least one base portion with either no or two folded wings arranged on either side of the base portion, and to create at least one free strand with two folded wings.

17 Claims, 5 Drawing Sheets

(58) Field of Classification Search
USPC ........................................................ 200/61.08
See application file for complete search history.

(56) References Cited

U.S. PATENT DOCUMENTS

| | | | | |
|---|---|---|---|---|
| 11,056,306 | B2 | 7/2021 | Gaudinat et al. | |
| 11,784,021 | B2 * | 10/2023 | Shi | H01H 85/10<br>337/121 |
| 2017/0076890 | A1 * | 3/2017 | Hori | B60L 3/0007 |

FOREIGN PATENT DOCUMENTS

| | | | |
|---|---|---|---|
| DE | 102014117280 | A1 | 5/2016 |
| FR | 3064107 | A1 | 9/2018 |

* cited by examiner

[Fig. 1]
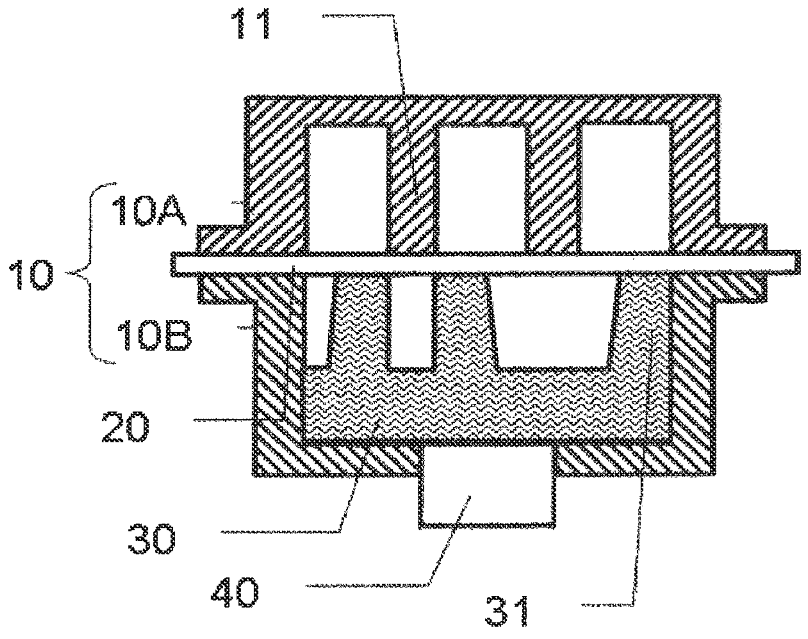
[Fig. 2]
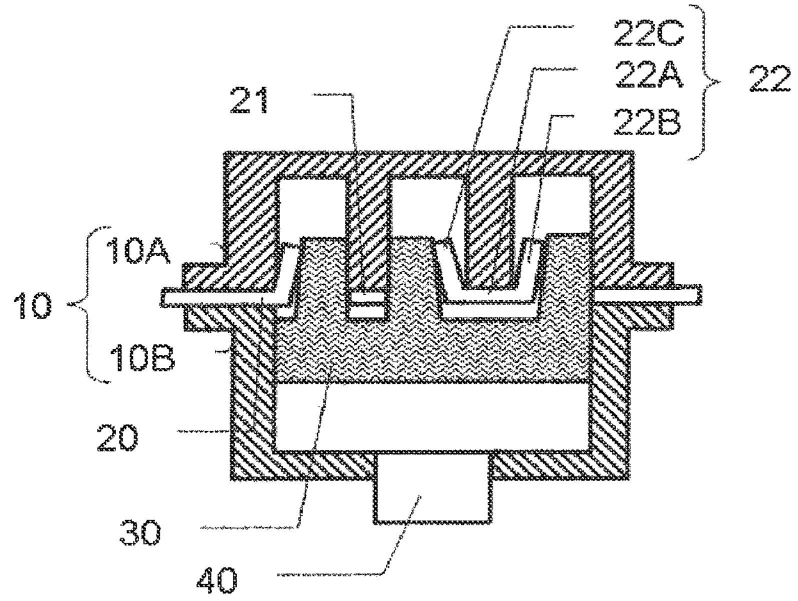

[Fig. 3]
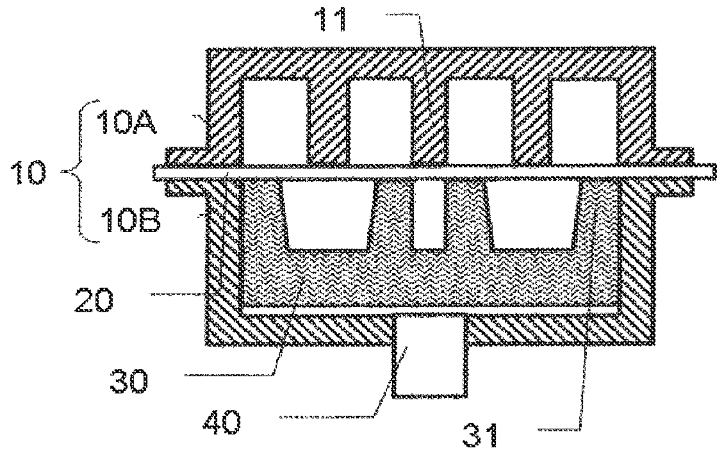
[Fig. 4]
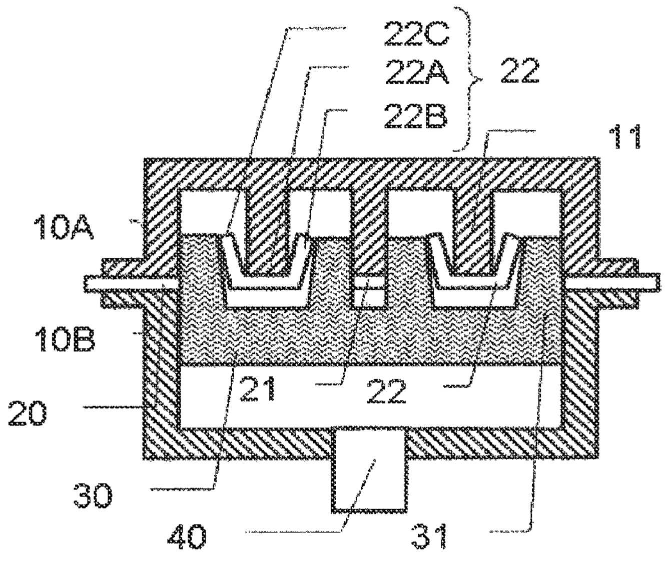

[Fig. 5]
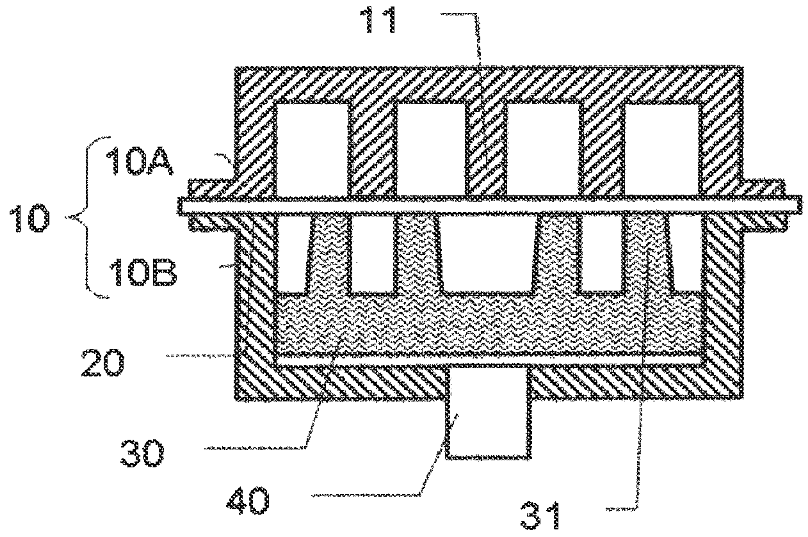
[Fig. 6]
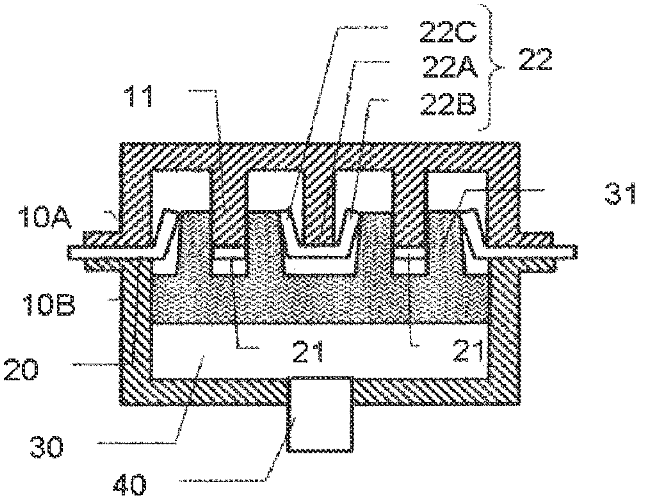

[Fig. 7]
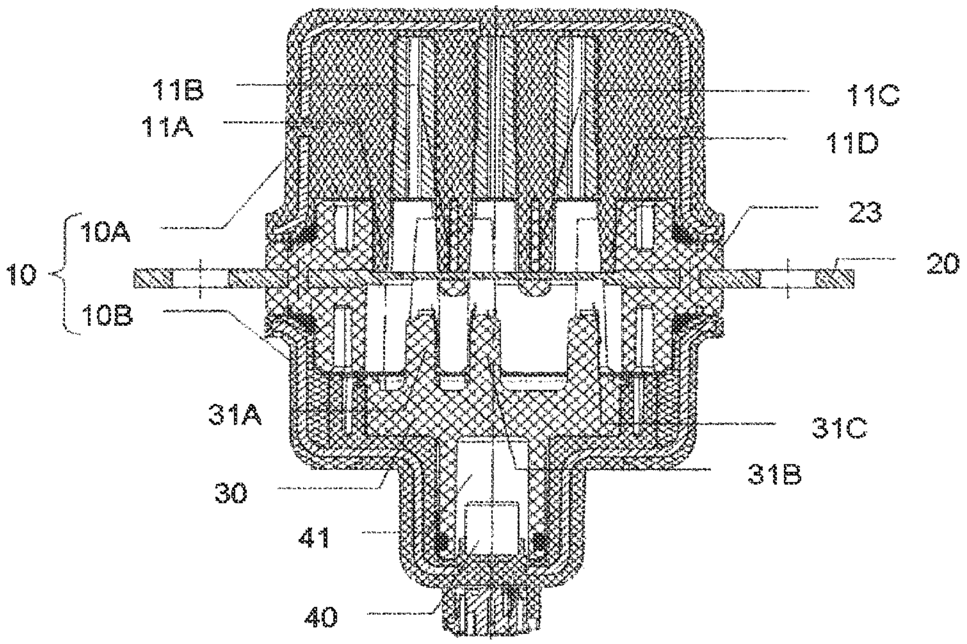
[Fig. 8]
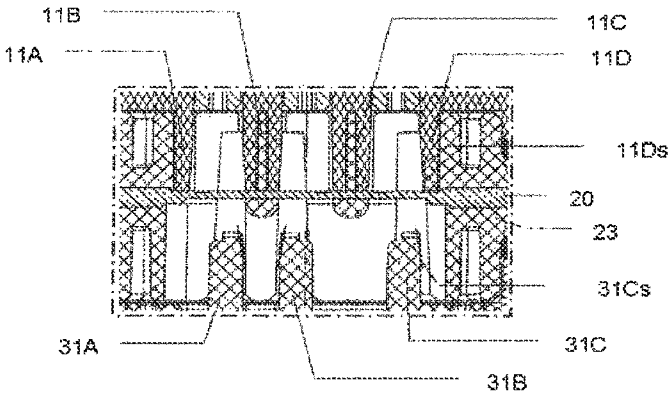

[Fig. 9]
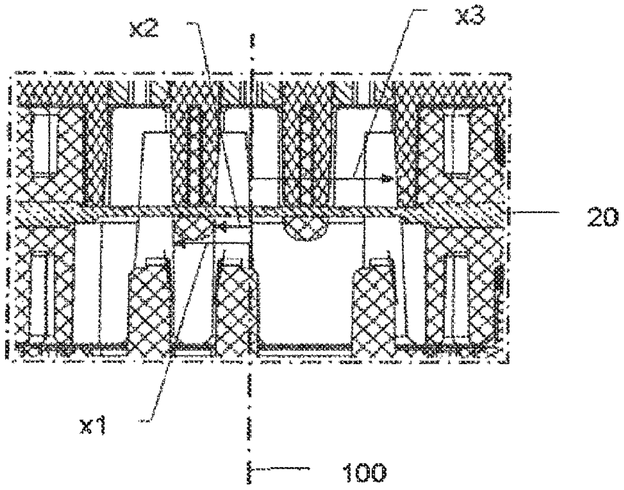

PYROTECHNIC SWITCH

FIELD

The present invention relates generally to a pyrotechnic switch for cutting off an electrical circuit, for example for cutting off a power electrical circuit of a motor vehicle in the event of an accident.

BACKGROUND

Pyrotechnic switches are known in the prior art, such as that disclosed in DE102012212509. However, that system has the disadvantage of a variable operating risk (depending on the electrical conductor cutoff conditions).

One goal of the present invention is to overcome the shortcomings of the prior art mentioned above and in particular, firstly, to propose a pyrotechnic switch which has a reliable circuit cut-off with predictable, well-understood current cut-off conditions.

SUMMARY

A first aspect of the invention therefore relates to a pyrotechnic switch, comprising:

- a casing,
- at least one electrical conductor passing through the casing,
- a piston housed in the casing, the piston-casing assembly being designed to cut the electrical conductor at least at three separate points, so as to form at least two free conducting strands, separate from the rest of the electrical conductor,
- a pyrotechnic actuator designed to force the piston to cut the electrical conductor,
- characterized in that the piston-casing assembly is designed to
- cut the electrical conductor such that each free strand has at least one base portion with either no or two folded wings arranged on either side of the base portion and to
- create at least one free strand with two folded wings.

The pyrotechnic switch according to the above implementation cuts the electrical conductor into several strands, which improves the cutting ability of the switch. In fact, cutting in several places means extending the length of a possible arc. Furthermore, each free strand comprises either only a base portion (undeformed) or a base portion with two folded wings. In other words, each free strand is either a straight or flat base portion, or a base portion framed by two folded wings. Thus, the free strands are symmetrical, which guarantees a balanced cut on each side: the forces are similar at each end of the free strands, which limits the risks of movement during cutting and thus of erratic operation that can affect the performance and/or integrity of the switch. Indeed, similar or symmetrical forces at the ends of each free strand will guarantee stability and the absence of unwanted movements during or after the cut. Such unwanted movements of conductive elements can either generate undesired arcing conditions that can affect the performance of the device and/or generate mechanical stresses, such as jamming, that can affect the integrity of components.

The pyrotechnic switch according to the above implementation thus comprises a piston that is movable between a rest position (wherein the electrical conductor is a continuous piece and can conduct electricity), and an activated position (wherein the electrical conductor is no longer intact and can no longer conduct electricity). The transition from the rest position to the activated position is caused by the pyrotechnic actuator, which is triggered or ignited, for example by an electronic unit or card of the vehicle. Finally, the transition from the rest position to the activated position thus causes the cutting of the electrical conductor, the formation of several free strands, and the folding of some of the free strands. The folded free strands therefore have a different shape before and after cutting.

However, each free strand includes a base portion (with or without folded wings) and this base portion is undeformed. That is, the base portion is a portion of the electrical conductor having the same shape before and after activation of the circuit breaker. In other words, each free strand includes a portion (the base portion) that has the same geometry as the original electrical conductor before cutting.

In particular, the base portion may not undergo plastic deformation when the initial electrical conductor is cut.

In particular, the base portion may simply undergo translation during the cut, and in the final position may end up parallel to its initial position.

In particular, the base portion can be parallel to a bearing surface of the piston, itself preferably perpendicular to a direction of movement of the piston.

According to one embodiment, the circuit breaker can be arranged to cut the electrical conductor by shearing. In particular, the piston of the circuit breaker may comprise a bearing surface that receives the base portion of each free strand without deforming it, and at least two cutting angles arranged on either side of the bearing surface, arranged to cut the electrical conductor by shearing.

According to one embodiment, the bearing surface can be framed by two protrusions of the piston, and the two cutting angles can each be arranged on one of the protrusions, and

- preferably on a flank of each protrusion opposite the bearing surface, so as to form a free strand with an undeformed base portion and two folded wings, or
- preferably on a flank of each protrusion adjacent to the bearing surface, so as to form a free strand with an undeformed base portion and no folded wings.

According to one embodiment, at least one free strand, and preferably each free strand, may have at least one reference portion that may occupy the same position in the casing both before and after cutting. Such an embodiment makes it possible to limit the movement of the electrical conductor and the free strands during cutting, which limits the risks of non-reproducibility.

According to one embodiment, the piston-casing assembly can be arranged to block at least one movement of each free strand after cutting. In other words, each free strand, whether it consists of a single base portion or a base portion and two folded wings, is held, retained, or locked in place by the piston-casing assembly.

According to one embodiment, the piston-casing assembly may have cutting protrusions, so that after cutting:

- a free strand with no folded wing can be arranged between two cutting protrusions with a clearance of less than 1 mm and preferably less than 0.5 mm, and/or
- a free strand with two folded wings can be arranged with a cutting protrusion of one component of the piston-casing assembly between the two folded wings, and with two adjacent cutting protrusions on the other component of the piston-casing assembly, each of which can contact one end of each folded wing.

According to the above embodiment, a cutting protrusion refers to a protrusion or projection that exerts a cutting force, and/or on which the electrical conductor rests at least during a moment of cutting. These protrusions can be on the casing or integral with it (therefore considered static), or on the piston or integral with it (therefore considered mobile).

According to the above embodiment:

- a free strand without folded wings has a cutting protrusion of one component of the piston-casing assembly facing or at its base portion, and has its ends in contact or nearly in contact with two adjacent cutting protrusions of the other component of the piston-casing assembly: it cannot move in its length direction;
- a free strand with two folded wings has a cutting protrusion of one component of the piston-casing assembly facing or at its base portion, and two adjacent cutting protrusions of the other component of the piston-casing assembly each in contact with an end of the free strand (the free ends of each folded wing). Thus each free strand, once separated from the electrical conductor, is held at its ends by cutting protrusions.

According to one embodiment, a free strand with no folded wing can be arranged in an enclosed space defined between at least:

- a cutting protrusion in one component of the piston-casing assembly, and
- two cutting protrusions on the other component of the piston-casing assembly.

According to one embodiment, the cutting protrusions may have draft angles.

According to one embodiment:

- the piston may comprise cutting protrusions forming knives, the casing may comprise cutting protrusions forming dies, and, after cutting, each knife of the piston can be arranged between two dies.

According to one embodiment, after cutting, at least one, and preferably each, draft face of each knife may face a draft face of a die. This embodiment ensures that the piston reliably closes a volume around the free strands. This is because the draft faces rest on each other, and because the draft faces are reversed, the contact between the piston knives and the casing dies is a surface contact. Any arc is then reliably confined, and any leakage path is over a long distance, between two parts in surface contact.

According to one embodiment, after cutting, each knife of the piston can be arranged between two faces of a die, and preferably between two draft faces of a die. In other words, a die can be provided on either side of each knife, even for the side knives: a side die can be provided on either side of the casing to provide a draft face facing each side knife.

According to one embodiment, the dies can be integral or formed directly with the casing.

According to one embodiment, the draft angle of one of the piston/casing assembly is equal to the draft angle of the other of the piston/casing assembly. According to this embodiment, the side faces (draft) of the piston and the casing are parallel to each other.

According to one embodiment, the draft angle of one component of the piston/casing assembly is different from the draft angle of the other component of the piston/casing assembly, and contained within the frictional cone of the contacting draft surfaces. According to this embodiment, the side faces (draft) of the piston and the casing are not parallel to each other, but the difference in angle is less than the angle of friction, so that there is wedging between the surfaces once the piston is in the activated position, so that it remains in this position. In particular, if the surfaces are plastic, then the difference in draft angles will remain less than 5°.

According to one embodiment, the folds of a free strand with two folded wings can be symmetrical.

According to one embodiment, the pyrotechnic switch may comprise, after cutting, two separate elements including:

- a free strand with a base portion without folded wings,
- a free strand with a base portion with two folded wings.

In other words, there is a free straight strand, which is rectilinear or not deformed by the passage of the piston (base portion only) and a folded strand with two folded wings. Generally speaking, the cut is made by generating an alternation of free strands without folded wings and free strands with two folded wings.

According to one embodiment:

- the piston can have an axis for applying a thrust force of the pyrotechnic actuator,
- the piston-casing assembly can be arranged to cut the electrical conductor at points located at a predetermined distance from the force application axis, and the sum of the predetermined distances of the points located on one side of the force application axis may be equal to the sum of the predetermined distances of the points located on the other side of the force application axis. The position of the cutting points along the electrical conductor is distributed in such a way that the force application axis runs through the middle, which ensures that there is no overturning torque on the piston. The piston will therefore have a smooth and easy movement from the rest position to the activated position, with a limited risk of bowing or jamming.

According to one embodiment, the electrical conductor may have at least a first portion anchored in the casing, and a second portion facing the piston, and the second portion may have a cross-sectional area smaller than a cross-sectional area of the first portion. The second portion is typically the one on which the piston will exert its cutting force, it is weaker, so the first portion will be little stressed. The break in the second portion is guaranteed.

According to one embodiment, the first portion may be overmolded in a material forming a separate part of the casing. In conjunction with the embodiment where the piston knives come between dies of the casing, this implementation allows for easier manufacturing with adequate drafts even for the overmolding of the electrical conductor, while ensuring that the piston comes into surface contact on the casing, in the activated position.

According to one embodiment, the piston and/or casing may include at least one insert at a cutting protrusion.

According to one embodiment, after cutting, the free strands can be trapped in the casing.

According to one embodiment, the pyrotechnic switch may include anti-reverse elements. It is possible to consider a tight fit, a jamming at the end of the piston stroke, or an engagement with an anti-return bracket for example.

A second aspect of the invention relates to a motor vehicle, comprising at least one pyrotechnic switch according to the first aspect of the invention.

It is understood that all of the above technical features may be combined with or separated from each other as long as there are no technical inconsistencies or incompatibilities.

BRIEF DESCRIPTION OF THE DRAWINGS

Other characteristics and advantages of the present invention will become more apparent upon reading the detailed description of several embodiments of the invention, which are provided by way of example but in no manner limited thereto, and illustrated by the attached drawings, in which:

FIG. 1 shows a schematic view of a first embodiment of a pyrotechnic switch according to the invention, before triggering;

FIG. 2 shows the pyrotechnic switch of FIG. 1, after triggering;

FIG. 3 shows a schematic view of a second embodiment of a pyrotechnic switch according to the invention, before triggering;

FIG. 4 shows the pyrotechnic switch of FIG. 3, after triggering;

FIG. 5 represents a schematic view of a third implementation of a pyrotechnic switch according to the invention, before triggering;

FIG. 6 shows the pyrotechnic switch of FIG. 5, after triggering;

FIG. 7 shows a detailed cross-section of the pyrotechnic switch of FIG. 1;

FIG. 8 shows a detail of FIG. 7, to demonstrate an aspect of the invention;

FIG. 9 shows the detail of FIG. 8, to demonstrate another aspect of the invention.

DETAILED DESCRIPTION

FIG. 1 depicts a pyrotechnic switch that comprises a casing 10 consisting of an upper casing portion 10A and a lower casing portion 10B. An electrical conductor 20 passes through the casing 10 and a piston 30 is located under the electrical conductor 20, and a pyrotechnic actuator (an electro-pyrotechnic igniter 40) is provided integral with the lower casing portion 10B.

Referring to FIG. 7, in more detail, the piston 30 is mounted movable with respect to the casing 10, between a rest position (in FIGS. 1 and 7) and an activated position (in FIG. 2). The electro-pyrotechnic igniter 40 opens into a combustion or pressurization chamber 41, so that when the electro-pyrotechnic igniter 40 is triggered, a sudden pressure increase occurs in the combustion chamber 41, causing the piston 30 to move from the rest position to the activated position.

Typically, the triggering of the electro-pyrotechnic igniter 40 is caused by an electronic control unit, after detection of a situation where the electrical conductor 20 must be cut off (for example a vehicle impact, if the electrical conductor 20 is part of an electrical circuit comprising batteries to be isolated after a impact).

During this transition of the piston 30 from the rest position to the activated position, the electrical conductor 20 is cut by cutting protrusions provided on the piston 30—casing 10 assembly. In detail, the piston 30—casing 10 assembly includes cutting (or cutting and bending as explained below) protrusions which are dies 11 on the casing 10 (11A, 11B, 11C, 11D in FIG. 7 only) and knives 31 on the piston 30 (31A, 31B, 31C in FIG. 7). As visible in FIGS. 1 and 7, prior to actuation, the electrical conductor 20 is arranged between the cutting protrusions of the casing 10, that is the dies 11 (11*a*, 11B, 11C, 11D in FIG. 7, which will not be repeated again in the remainder of the description) of the casing 10, and the cutting protrusions of the piston 30, that is the cutters 31 (31A, 31B, 31C in FIG. 7, which will not be repeated again in the remainder of the description) on the piston 30.

When the piston 30 rises after triggering, the knives 31 will cut the electrical conductor 20 that at the time is resting on the dies 11.

The electrical conductor 20 is then cut at three points and two free strands 21 and 22 are created or formed, as shown in FIG. 2. These free strands 21 and 22 are detached from the rest of the electrical conductor and as seen in FIG. 2, the free strand 21 comprises only a straight base portion (or not deformed by the knives/dies, that is, the shape is identical before and after cutting), and free strand 22 comprises a base portion 22A, with two folded wings 22B and 22C.

In addition, each end of the free strand 21 contacts one of two adjacent punches 31 on the piston 30, and the ends of the folded wings 22B and 22C also each contact one of two adjacent punches 31 on the piston 30. Thus, each free strand is stuck in the position occupied in FIG. 2. In particular, the free strands 21 and 22 cannot move in the axial direction of the conductor 20 before triggering (the horizontal direction in FIG. 2).

Safety and reliability are improved because the path of a possible arc is the one between the ends in the position shown in FIG. 2. This is because unintended movement and displacement of the free strands 21 and 22 is eliminated, as the free strands 21 and 22 are held in position or blocked by the cutting protrusions (the dies 11 and the knives 31 which rest on each other to form closed spaces, and which touch the free strands in such a way as to hold them in place). The conditions for establishing an arc will thus always be the same on a series of switches. Furthermore, there is no risk of jamming the piston 30 due to a loose strand not staying in place.

Also, returning to FIG. 7, it should be noted that the electrical conductor 20 is overmolded in an insert portion 23, which is separate from the upper 10A and lower 10B casing parts. As shown in FIG. 8, this construction allows for drafts on the cutting protrusions located on the casing 10 that provide an additional technical effect.

Indeed, focusing on the right-hand cutting protrusions (the die 11D and knife 31C in FIG. 8), it can be seen that the side face 31Cs of the knife 31C has a draft angle, which improves the manufacturing of the part by injection molding. Similarly, the side face 11Ds of the die 11D has a draft angle. Since the die 11D is not overmolded onto the electrical conductor 20 (since it is the insert portion 23 that is overmolded onto the electrical conductor 20), then the draft angle of the side face 11Ds of the die 11D is effectively complementary to the draft angle of the side face 31Cs of the knife 31C. It should be noted that such a complementary angle cannot be obtained on the insert portion 23 by injection molding.

As a result, when the piston 30 is in the activated position, then the side face 11Ds of the die 11D may be in surface contact with the side face 31Cs of the knife 31C (and not in line contact). Note that what is said here is valid for each cutting protrusion: each punch 31 of the switch piston 30 has at least one side face that will come into surface contact with a side face of a die 11 of the casing 10 (that is with a draft complementary to a draft of the side face of the relevant die). This creates a succession of closed spaces with surface contacts. This makes it possible to control the path of an electric arc by defining a specific zone of non-contact such as a groove to force the arc to always go to the same place.

It should be noted that in this first embodiment, the cutting of the electrical conductor 20 is a shearing performed at the die 11B with the knives 31A and 31B, and at the die 11D with the knife 31C. The dies 11A and 11C serve as a fulcrum to force the bending of the electrical conductor 20 and the free strand 22. Accordingly, the aforementioned cutting protrusions are involved in either shearing or bending the electrical conductor 20.

FIG. 9 shows in detail the position of the shear cut points, and their distance from an axis 100. In particular, axis 100 is the thrust force application axis on the piston 30. On one side of the axis 100, the electrical conductor 20 is cut at points distant from the axis 100 by a distance x1 and x2, while on the other side of the axis 100, the electrical conductor 20 is cut at the point distant from the axis 100 by a distance x3. It is intended that x1+x2=x3±20%; so as to avoid any tilting torque of the piston 30 within the casing 10. Thus, the movement of the piston 30 is reliable, with forces equally distributed on both sides of the axis of application of the pressure force, even when shearing off at several points.

In general, it is intended that the piston 30 be held in the activated position, for example, by anti-reverse means, such as a tight fit at the end of the stroke, clipping, or locking with a flexible tab.

In summary of this first embodiment, the piston 30—casing 10 assembly is arranged to shear the electrical conductor at three distinct points, so:

that two separate free strands are formed, which lengthens the path of an electric arc, that a first free strand 21 is without folded wings and symmetrical, that a second free strand 22 is with two folded wings and symmetrical, which avoids any asymmetrical effort that could lead to an untimely or random displacement of the free strands 21, 22, that each free strand 21, 22 has its ends in contact with a cutting protrusion, which holds or locks the free strands 21, 22 in place in the casing 10, that, in the final position or activated position, the piston 30 contacts the casing 10 in a surface contact, so as to close a cut-off chamber with a leakage path or arc path of several millimeters between two surfaces in contact with each other.

FIG. 3 shows a second embodiment, wherein the piston 30 comprises four knives 31, so that the electrical conductor 20 will be cut into three separate free strands 21 and 22. In this implementation, one free strand 21 (without folded wings) and two free strands 22 (with two folded wings) are formed, as shown in FIG. 4. The rest of the technical details and advantages remain the same as in the first embodiment.

FIG. 5 shows a third embodiment, wherein the piston 30 comprises four knives 31, so that the electrical conductor 20 will be cut into three separate free strands 21 and 22. In this third implementation, two free strands 21 (without folded wings) and one free strand 22 (with two folded wings) are formed, as shown in FIG. 6. The rest of the technical details and advantages remain the same as in the first embodiment.

It will be understood that various modifications and/or improvements which are obvious for the person skilled in the art may be made to the different embodiments of the invention described in this present description without departing from the scope of the invention. In particular, reference is made to wings folded at a single point, but it is possible to fold the free strands along a large radius of curvature, or along several folds.

The invention claimed is:

1. A pyrotechnic switch, comprising:

a casing, at least one electrical conductor passing through the casing, a piston-casing assembly including the casing and a piston housed in the casing, the piston-casing assembly being designed to cut the electrical conductor at least at three separate points, so as to form at least two free conducting strands, separate from remainder of the electrical conductor, a pyrotechnic actuator for forcing the piston to cut the electrical conductor, wherein the piston-casing assembly is configured to:

cut the electrical conductor such that each free strand has at least one undeformed base portion and each free strand includes no or two folded wings arranged on either side of the base portion.

2. The pyrotechnic switch according to claim 1, wherein the piston-casing assembly is arranged to block at least one movement of each free strand after cutting.

3. The pyrotechnic switch according to claim 1, wherein the piston-casing assembly has cutting protrusions, so that after cutting:

a free strand with no folded wings is arranged between two cutting protrusions with a clearance of less than 1 mm and preferably less than 0.5 mm, and/or a free strand with two folded wings is arranged with a cutting protrusion of a first component of the piston-casing assembly between the two folded wings, and with two adjacent cutting protrusions of a second component of the piston-casing assembly, each of two adjacent cutting protrusions being in contact with one end of each folded wing.

4. The pyrotechnic switch according to claim 3, wherein a free strand with no folded wing is arranged in an enclosed space defined between at least:

a cutting protrusion in the first component of the piston-casing assembly, and two cutting protrusions on the second component of the piston-casing assembly.

5. The pyrotechnic switch according to claim 3, wherein the cutting protrusions have draft angles.

6. The pyrotechnic switch according to claim 3, wherein:

the piston comprises cutting protrusions forming knives, the casing comprises cutting protrusions forming dies, and after cutting, each knife of the piston is arranged between two dies.

7. The pyrotechnic switch according to claim 6, wherein the cutting protrusions have draft angles, wherein after cutting, at least one, and preferably each, draft face of each knife faces a draft face of a die.

8. The pyrotechnic switch according to claim 1, wherein folds of a free strand with two folded wings are symmetrical.

9. The pyrotechnic switch according to claim 1, comprising, after cutting, two separate elements, the two separate elements including:

a free strand with a base portion without folded wings, and a free strand with a base portion with two folded wings.

10. The pyrotechnic switch according to claim 1, wherein:

the piston has a thrust force application axis of the pyrotechnic actuator, the piston-casing assembly is arranged to cut the electrical conductor at points located at a predetermined distance from the thrust force application axis, and a first sum of the predetermined distances of the points located on one side of the thrust force application axis is equal to a second sum of the predetermined distances of the points located on another side of the thrust force application axis.

11. The pyrotechnic switch according to claim 1, wherein the electrical conductor has at least a first portion anchored in the casing, and a second portion facing the piston, and wherein the second portion has a smaller cross-sectional area than a cross-sectional area of the first portion.

12. The pyrotechnic switch according to claim 11, wherein the first portion is over-molded in a material forming a separate part from the casing.

13. The pyrotechnic switch according to claim 1, wherein the piston and/or casing comprises at least one insert at a cutting protrusion.

14. The pyrotechnic switch according to claim 1, wherein after cutting, the free strands are trapped in the casing.

15. The pyrotechnic switch according to claim 1, combination with a motor vehicle.

16. The pyrotechnic switch according to claim 1, wherein the piston-casing assembly is configured to:

cut the electrical conductor such that at least one free strand has two wings, the wings arranged on either side of the base portion.

17. The pyrotechnic switch according to claim 1, wherein the piston includes at least three knives for cutting the electrical conductor three times to create the at least two free conducting strands.

* * * * *